(12) United States Patent
Kazama et al.

(10) Patent No.: US 7,291,412 B2
(45) Date of Patent: Nov. 6, 2007

(54) CONTROL APPARATUS AND CONTROL METHOD OF FUEL CELL SYSTEM

(75) Inventors: Isamu Kazama, Kanagawa-ken (JP); Kazuma Okura, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/181,486

(22) PCT Filed: Nov. 9, 2001

(86) PCT No.: PCT/JP01/09826

§ 371 (c)(1),
(2), (4) Date: Jul. 19, 2002

(87) PCT Pub. No.: WO02/45992

PCT Pub. Date: Jun. 13, 2002

(65) Prior Publication Data

US 2003/0003335 A1  Jan. 2, 2003

(30) Foreign Application Priority Data

Dec. 4, 2000  (JP)  ............................. 2000-369141

(51) Int. Cl.
*H01M 8/04* (2006.01)
*H01M 8/00* (2006.01)
*H01M 8/18* (2006.01)

(52) U.S. Cl. .............................. 429/23; 429/12; 429/13; 429/20; 429/22

(58) Field of Classification Search .................. 429/12, 429/13, 20, 22, 23
See application file for complete search history.

(56) References Cited

U.S. PATENT DOCUMENTS 5,646,852 A  7/1997  Lorenz et al.

6,447,939 B1 * 9/2002 Iwasaki .......................... 429/9

FOREIGN PATENT DOCUMENTS

| JP | 10-40144 | 2/1998 |
|---|---|---|
| JP | 10-271706 | 10/1998 |
| JP | 11-178116 A | 7/1999 |
| JP | 2000-012059 A | 1/2000 |
| JP | 2000-348746 A | 12/2000 |
| JP | 2001-298806 A | 10/2001 |
| JP | 2002-093443 A | 3/2002 |
| JP | 2002-289238 A | 10/2002 |
| JP | 2002-334712 A | 11/2002 |
| JP | 2003-077514 A | 3/2003 |
| WO | WO 99/67846 | 12/1999 |
| WO | WO99/67846 | * 12/1999 |

* cited by examiner

*Primary Examiner*—Dah-Wei Yuan
(74) *Attorney, Agent, or Firm*—Foley & Lardner LLP

(57) ABSTRACT

A control apparatus and a control method are used in a fuel cell system, in which fuel gas and oxidant gas are supplied to a fuel cell stack 1 to generate electric power, a load unit 9 is driven by supplying the generated power thereto, and the generated power is stored in a power storage unit. A control unit 10 sets in advance a margin load power to be supplied from a power storage unit 8 to the fuel cell stack 1 when the load of the load unit 9 changes at a predetermined rate, and computes outputable power of the power storage unit 8. Then, the control unit 10 compares the margin load power and the outputable power to generate an amount judgment result. When the outputable power is larger than the margin load power, the control unit 10 controls the power generation amount of the fuel cell stack 1 such that charged power becomes equal to an electric power difference between the margin load power and the outputable power.

12 Claims, 14 Drawing Sheets

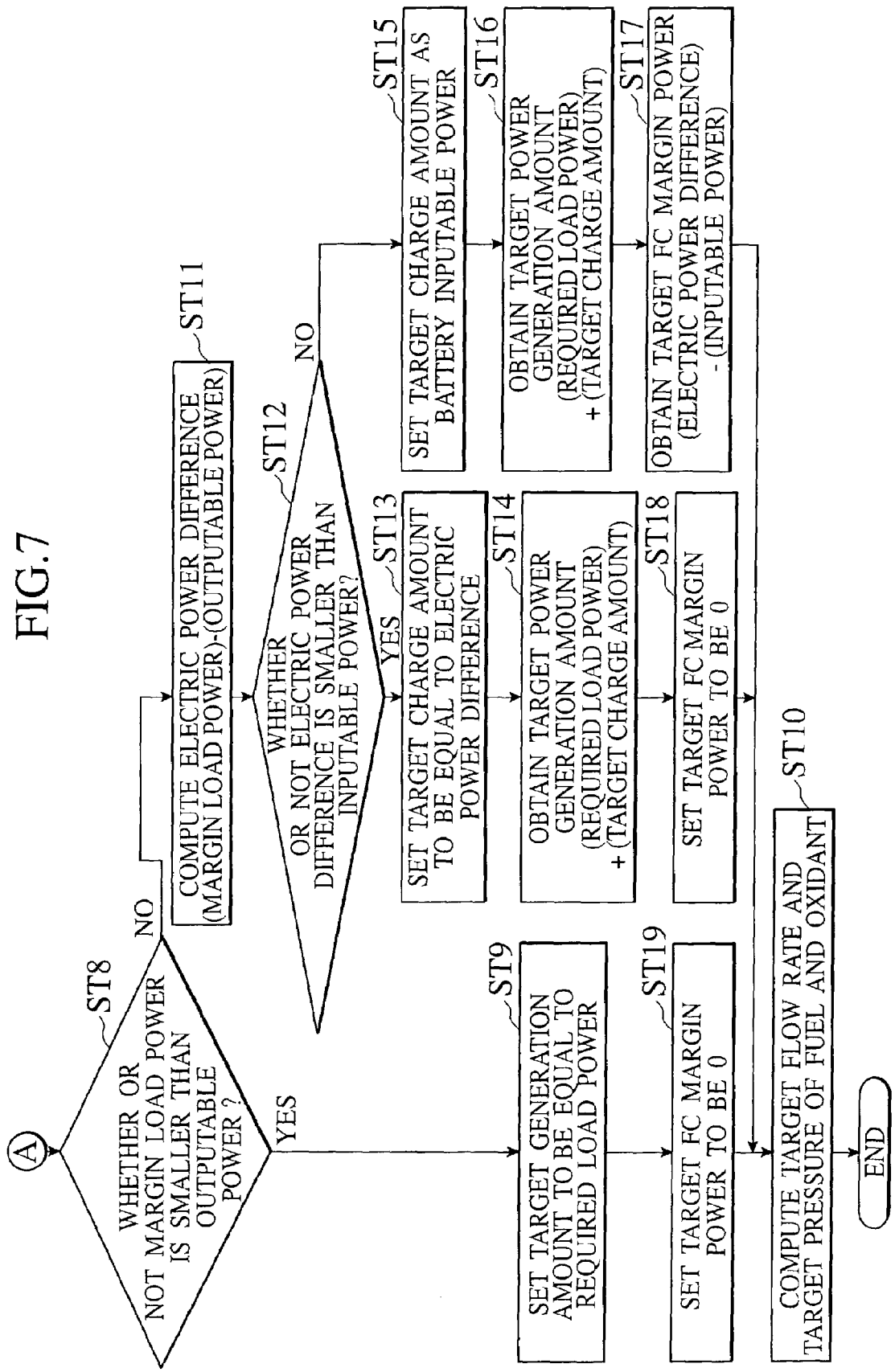

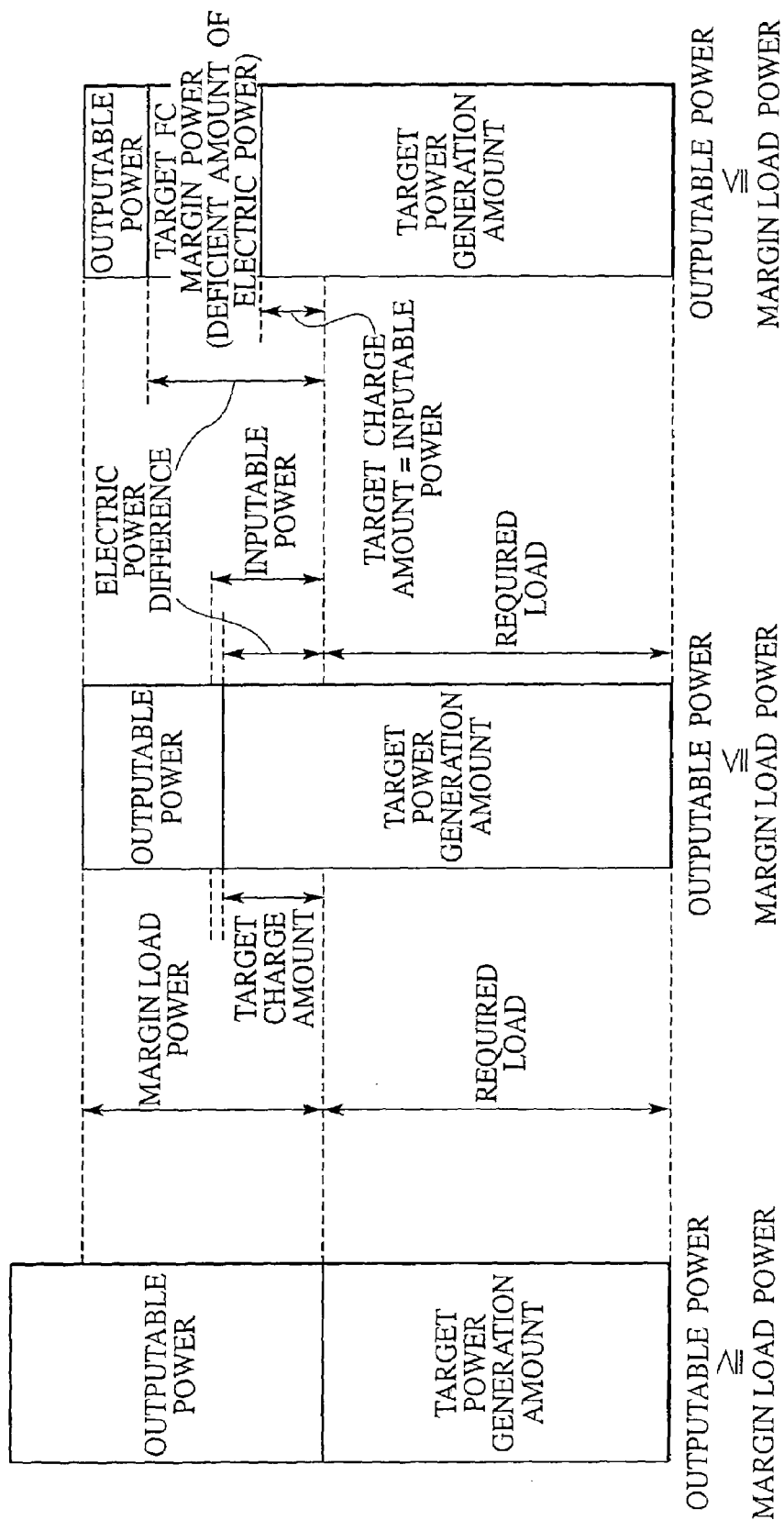

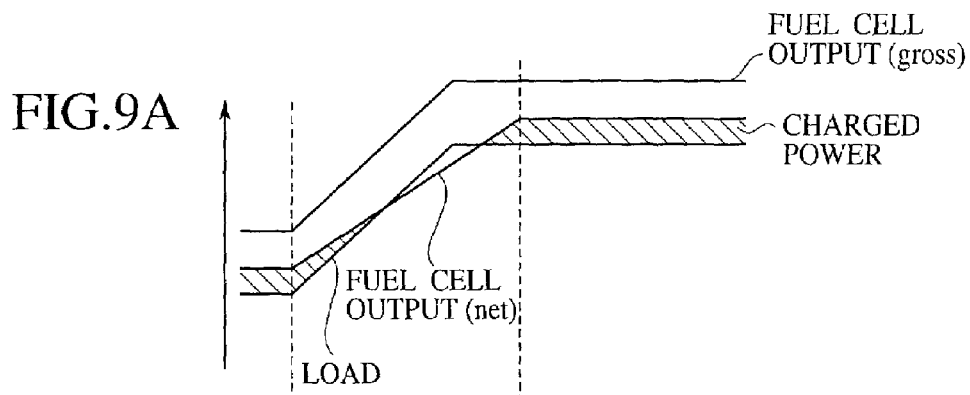
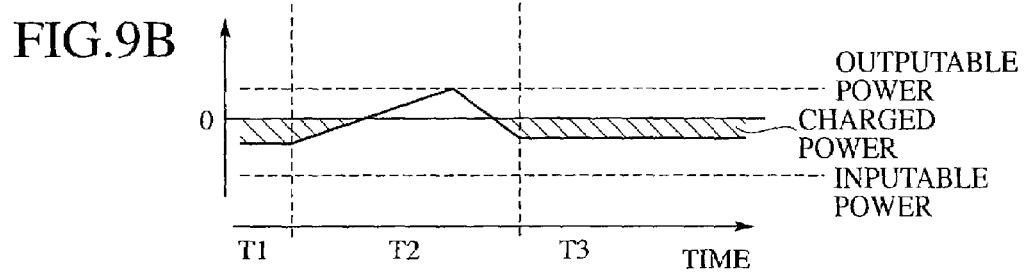
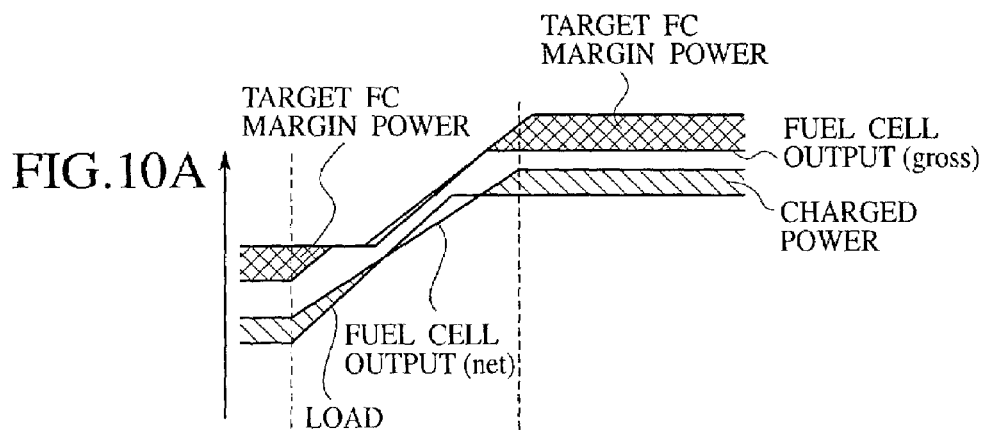
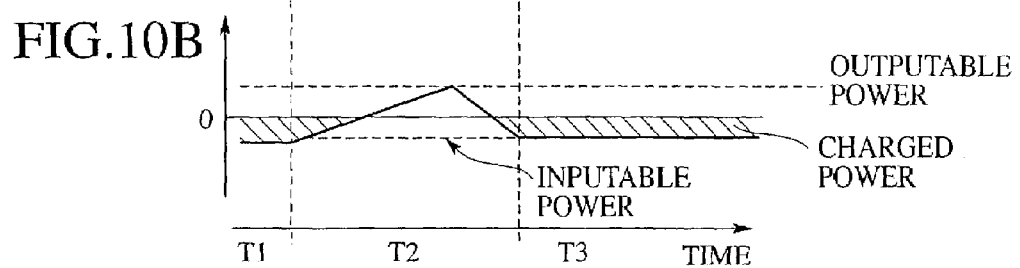

CONTROL APPARATUS AND CONTROL METHOD OF FUEL CELL SYSTEM

TECHNICAL FIELD

The present invention relates to a control apparatus and a control method of a fuel cell system, in which fuel gas and oxidant gas are supplied to a fuel cell to generate electric power, the generated power is supplied to a load circuit to drive a load, and the generated power is also stored in a power storage unit.

BACKGROUND ART

In a fuel cell system used as a power source of a vehicle, a fuel cell stack is often used. The fuel cell stack is obtained in such a manner that a fuel cell structure having an oxidant electrode and a fuel electrode provided as a pair interposing a solid polymer electrolyte film therebetween is sandwiched by separators, and a plurality of the fuel cell structures are laminated on each other. Electric power generated from the fuel cell stack is charged to a battery and then used to drive a motor in the vehicle.

With respect to a fuel cell system, a control, which is performed in such a manner that a charge level of a battery (SOC) is set high at the time of low speed driving to secure driving force of a motor and to secure electric power capable of being outputted from the battery, is disclosed in the gazette of Japanese Patent Laid-Open No. 2000-92610.

Also, with respect to a conventional fuel cell system, for example, a method is disclosed in the gazette of Japanese Patent Laid-Open No. 10(1998)-271706. In this method, a state is detected where a main load, such as a motor installed in a vehicle, is almost zero. As a result of the detection, when a judgment for the detected state tells that a battery is to be charged, the battery is charged. According to this method, in the conventional fuel cell system, it has been possible to supply sufficient electric power at all times, even when the electric power required by the load changes by a large amount.

DISCLOSURE OF INVENTION

However, in a fuel cell system disclosed in the gazette of Japanese Patent Laid-Open No. 2000-92610, a control is performed in such a manner that a vehicle speed is detected and a target charge level is set in accordance with the detected vehicle speed, thus securing outputable power of a battery. Therefore, it requires a certain amount of time for actually charging the battery and securing the output, resulting in a problem that the fuel cell system cannot meet immediate needs in some cases.

Also, in a fuel cell system disclosed in the gazette of Japanese Patent Laid-Open No. 10(1998)-271706, a control is performed in such a manner that if a state is detected in which a battery should be charged is considered to be a state in which a main load becomes almost zero, then a battery is judged to be charged. Therefore, when a relatively intermediate load continues, i.e., a period of time when the main load is almost zero is short, the battery cannot be sufficiently charged. Consequently, in this fuel cell system, there has been a problem that supplied electric power to a change in used power required by the load becomes deficient.

The present invention was made taking the above-described problems into consideration, and an object thereof is to provide a control method and a control apparatus for a fuel cell system capable of achieving sufficient power supply at any time to a load whose used power changes.

In order to solve the above-described problems, a first aspect of the present invention is a control apparatus for a fuel cell system; in which fuel gas and oxidant gas are supplied to a fuel cell to generate electric power, a load is driven by supplying the generated power to a load circuit, and the generated power from the fuel cell is stored in a power storage unit. The control apparatus comprises: a margin load power setting section for setting a margin load power amount, which is an increased amount of the electric power supplied from the power storage unit and the fuel cell to the load circuit when the load of the load circuit is increased at a predetermined rate; an outputable power computing section for computing outputable power of the power storage unit; an inputable power computing section for computing electric power capable of being inputted and stored in the power storage unit; and a control section for comparing the margin load power set by the margin load power setting section and the outputable power computed by the outputable power computing section to generate an amount judgment result, comparing the inputable power and an electric power difference between the margin load power and the outputable power when the outputable power is smaller than the margin load power as a result of the amount judgment to generate an amount judgment result, generating electric power to set the inputable power to be charged power of the power storage unit when an electric power difference between the margin load power and the outputable power is larger than the inputable power as a result of the amount judgment, and controlling a flow rate or pressure of gas supplied to the fuel cell to make it possible to always generate electric power equivalent to a deficient amount of the electric power obtained by subtracting the inputable power and the outputable power from the margin load power.

Furthermore, a second aspect of the present invention is a control method for a fuel cell system in which fuel gas and oxidant gas are supplied to a fuel cell to generate electric power, a load is driven by supplying the generated power to a load circuit, and the generated power from the fuel cell is stored in a power storage unit. The control method comprises the steps of: setting in advance a margin load power amount, which is an increased amount of an electric power amount supplied from the power storage unit and the fuel cell to the load when the load of the load circuit is increased at a predetermined rate; computing electric power capable of being inputted and stored in the power storage unit, and computing outputable power of the power storage unit; generating an amount judgment result by comparing the inputable power and the electric power difference between the margin load power and the outputable power; and generating the electric power such that the inputable power becomes the charged power to the power storage unit, and controlling the flow rate or the pressure of the gas supplied to the fuel cell such that a deficient amount of the electric power obtained by subtracting the inputable power and the outputable power from the margin load power is always generated when the electric power difference between the margin load power and the outputable power is larger than the inputable power as a result of the amount judgment.

BRIEF DESCRIPTION OF DRAWINGS

FIG. 7 is a flow chart showing process steps of a power control process by the control unit.

FIG. 8A shows a relation among a load required by the load unit, a target power generated amount and an outputable power against margin load power, FIG. 8B shows a relation among a load required by the load unit, a target power generated amount against margin load power, an outputable power and a deficient amount, and FIG. 8C shows a relation among a load required by the load unit, a target power generated amount against margin load power, an outputable power, a target FC margin power and a deficient amount.

FIG. 9A is a graph showing a relation between an output of the fuel cell stack and a load required by the load unit, and FIG. 9B is a graph showing a change in electric power in the power storage unit.

FIG. 10A is another graph showing a relation between an output of the fuel cell stack and a load required by the load unit, and FIG. 10B is another graph showing a change in electric power in the power storage unit.

BEST MODE FOR CARRYING OUT THE INVENTION

Hereinafter, an embodiment of the present invention will be described with reference to the drawings.

Figure 1:
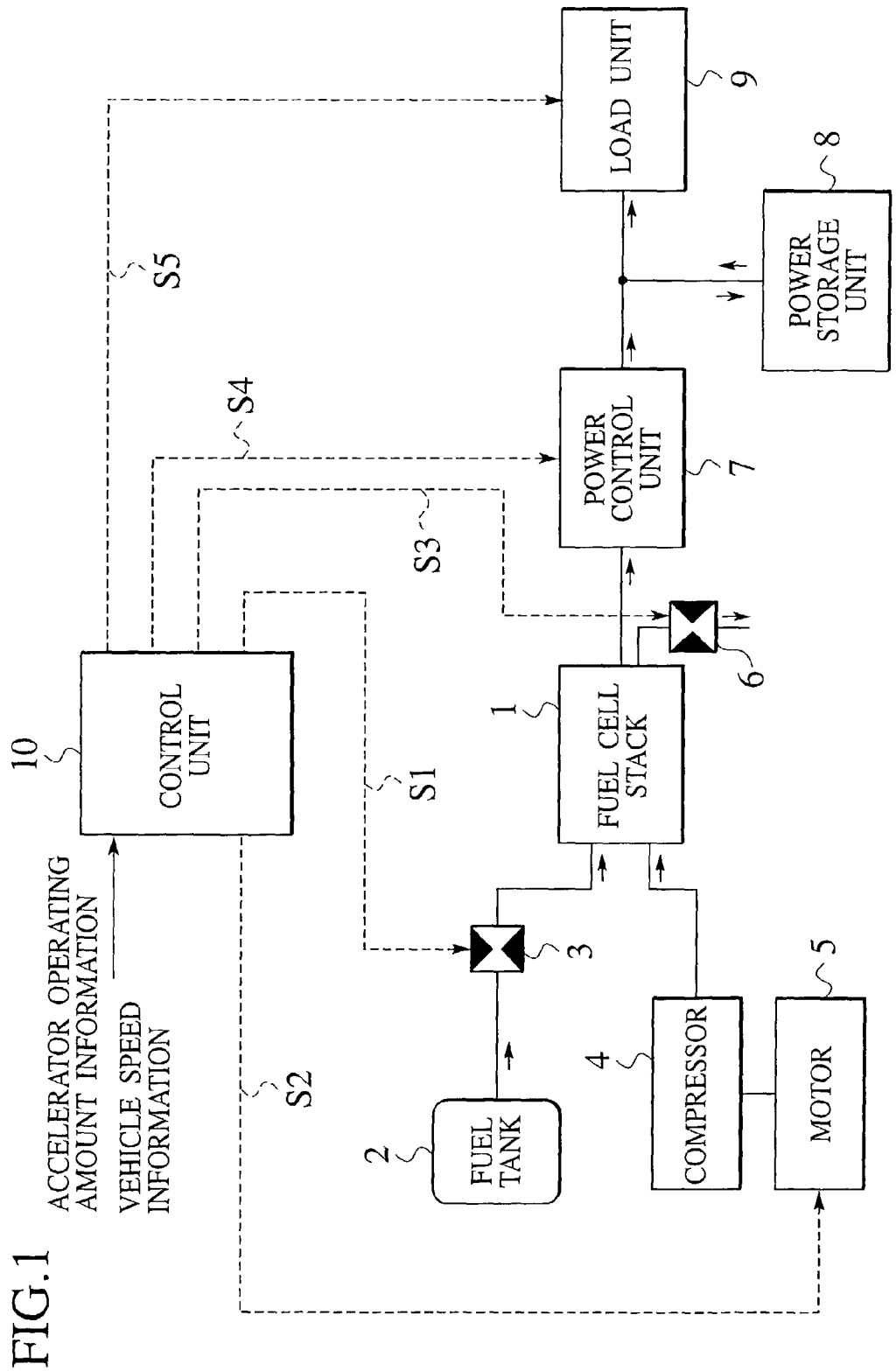
FIG. 1 is a constitutional diagram of a fuel cell system to which the present invention is applied.

The present invention is applied to a fuel cell system constituted as shown in FIG. 1 for example.

This fuel cell system is provided with a fuel cell stack 1 that is supplied with hydrogen-containing gas and fuel gas to generate electric power. This fuel cell stack 1 consists of, for example, a plurality of fuel cell structures in which separators sandwich a fuel cell structure mounting an oxidant electrode and a fuel electrode that are interposing a solid polymer electrolyte film therebetween. This fuel cell stack 1 generates electric power by being supplied with oxygen-containing air as oxidant gas to its oxidant electrode and by being supplied with hydrogen gas as fuel gas to its fuel electrode, and is utilized as a drive source of, for example, a vehicle or the like.

Constitution of Fuel Cell System

As apparent from FIG. 1, this fuel cell system is provided with a fuel tank 2 for storing hydrogen gas to be supplied to the fuel cell stack 1 and a pressure control valve 3 for adjusting pressure and a flow rate of fuel gas to be supplied to the fuel cell stack 1. Here, the fuel cell stack 1, the fuel tank 2 and the pressure control valve 3 are connected to each other via a hydrogen passage tube. In the pressure control valve 3, a valve opening thereof is adjusted according to an opening control signal S1 from a later-described control unit 10 to control the pressure and the flow rate of the fuel gas to be supplied to the fuel cell stack 1.

Also, this fuel cell system is provided with a compressor 4 for supplying the oxidant gas to the fuel cell stack 1, a motor 5 for driving the compressor 4, and a pressure control valve 6 disposed on an oxidant gas exhausting side of the fuel cell stack 1. Here, the compressor 4, the fuel cell stack 1, and the pressure control valve 6 are connected to each other via an oxidant gas passage tube. The control unit 10 controls driving force of the compressor 4 based on a driving force of the motor 5 by outputting a driving force control signal S2 to the motor 5. The control unit 10 also controls oxidant gas pressure in the fuel cell stack 1 by controlling the pressure control valve 6 by outputting a valve opening control signal S3 thereto, which controls the flow rate of the oxidant gas to be supplied to the fuel cell stack 1.

Moreover, this fuel cell system is provided with a power control unit 7 electrically connected to the fuel cell stack 1, a power storage unit 8 for storing electric power generated by the fuel cell stack 1, and a load unit 9, such as a drive motor, which is driven by the electric power generated by the fuel cell stack 1. The storage unit 8 is composed of so-called batteries.

The power control unit 7 takes out the electric power from the fuel cell stack 1 according to a power control signal S4 from the control unit 10 and supplies the electric power to the motor 5 of the compressor, the load unit 9, the power storage unit 8 and the like. When an amount of the electric power supplied from the power control unit 7 is larger than that consumed in the load unit 9, the power storage unit 8 stores surplus electric power from the fuel cell stack 1 as charged power. When the amount of electric power supplied from the power control unit 7 is smaller than that consumed in the load unit 9, the power storage unit 8 supplies the electric power equivalent to the deficient amount to the load unit 9.

The control unit 10 computes accelerator operating amount information based on operation by a vehicle driver and vehicle speed information based on a vehicle speed pulse signal. The control unit 10 controls driving force by outputting a driving force control signal S5 to the load unit 9 according to a magnitude indicated by the accelerator operating amount information. Moreover, the control unit 10 obtains a target power generation amount through a computation based on the accelerator operating amount information and the vehicle speed information.

The control unit 10 computes the target power generation amount serving as a target of electric power generated from the fuel cell stack 1. Also, the control unit 10 controls the valve opening of the pressure control valve 3, the driving force of the motor 5, and the valve opening of the pressure control valve 6 so as to obtain a desired power generation amount. The control unit 10 also controls the pressure and the flow rate of the fuel gas and the oxidant gas supplied to the fuel cell stack 1, thus controlling the power generation amount of the fuel cell stack 1. Furthermore, the control unit 10 controls the power control unit 7, thus supplying electric power to the power storage unit 8 and the load unit 9.

Functional Constitution of Control Unit 10

Figure 2:
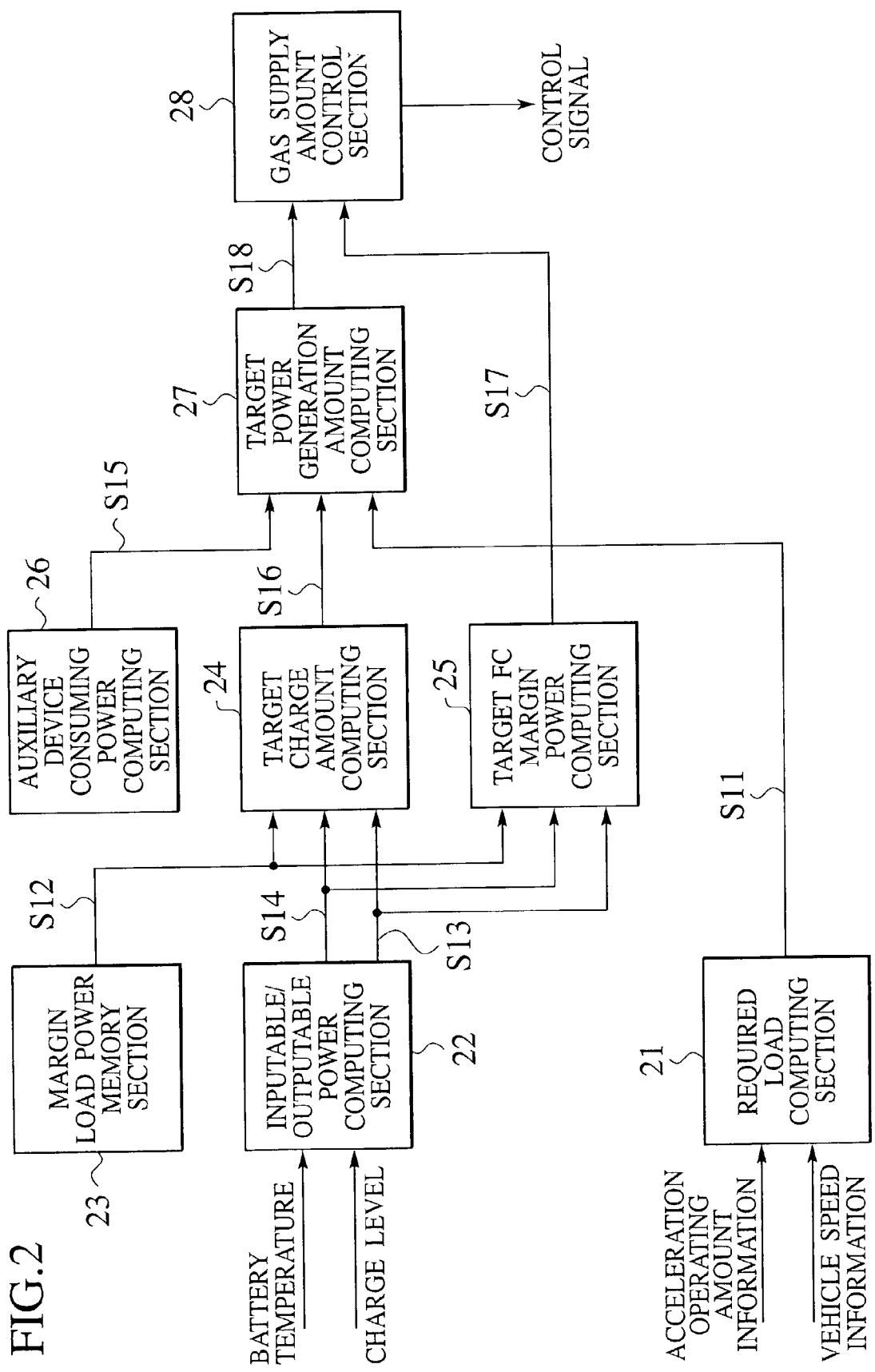
FIG. 2 is a block diagram showing a functional constitution of a control unit provided in the fuel cell system, to which the present invention is applied.

FIG. 2 is a block diagram showing a functional constitution of the control unit 10. As apparent from FIG. 2, the control unit 10 includes a required load computing section 21, which receives the accelerator operating amount information and the vehicle speed information, an inputable/outputable power computing section 22, which receives battery temperature information from a battery sensor for detecting a state of the power storage unit 8 (not shown) and charging level information showing a charging level of the power storage unit 8, and a margin load power memory section 23, which stores a value of electric power to compensate for the electric power required to the load unit 9 at the time of the maximum acceleration of the vehicle.

Moreover, the control unit 10 includes a target charge amount computing unit 24 for computing a target charge amount by the use of the pieces of information from the inputable/outputable power computing section 22 and the margin load power memory section 23, a target FC margin power computing section 25, an auxiliary device consumption power computing section 26 for computing consumed electric power in each component of the fuel cell system excluding the load unit 9, and a target power generation amount computing section 27 for computing a target power generation amount by the use of the pieces of information from the required load computing section 21, the target charge amount computing unit 24 and the auxiliary device consumption power computing section 26. The control unit 10 further includes a gas supply amount control section 28 for computing a gas supply amount by the use of the pieces of information from the target power generation amount computing section 27 and the target FC margin power computing section 25.

The required load computing section 21 computes a required load power required to drive the load unit 9 based on the accelerator operating amount information and the vehicle speed information. Then, the required load computing section 21 outputs the computed required load power information S11 to the target power generation amount computing section 27.

The inputable/outputable power computing section 22 computes inputable power information showing a value of the electric power capable of being stored in the power storage unit 8 and outputable power information showing a value of the electric power capable of being outputted from the power storage unit 8 to the load unit 9 based on the battery temperature and the charging level information. Then, the inputable/outputable power computing section 22 outputs inputable power information S14 and outputable power information S13 to the target charge amount computing unit 24 and the target FC margin power computing section 25.

The target charge amount computing unit 24 computes a target charge amount serving as a target of electric power that is generated by the fuel cell stack 1 and which is also stored in the power storage unit 8 based on margin load power information S12, the inputable power information S14 and the outputable power information S13. Then, the target charge amount computing unit 24 determines the target charge amount within a range of the inputable power so as to allow the charged power to approach the margin load power and then outputs target charged power information S16 to the target power generation amount computing section 27.

The target FC margin power computing section 25 computes information based on the margin load power information S12, the outputable power information S13 and the inputable power information S14. Then, the target FC margin power computing section 25 obtains target FC margin power information S17 showing the target FC margin power capable of being taken out immediately and supplied to the load unit 9, and outputs the same to the gas supply amount control section 28.

The target power generation amount computing section 27 computes information based on auxiliary device consumption power information S15, the target generated power information S16 and the required load power information S11. Then, the target power generation amount computing section 27 obtains target generated power information S18 showing a value of the electric power serving as a target of the electric power generated by the fuel cell stack 1 and outputs the same to the gas supply amount control section 28.

The gas supply amount control section 28 controls the pressure control valve 3, the motor 5, and the pressure control valve 6 based on the target generated power information S18 and the target FC margin power information S17 to control the pressure and the flow rate of the fuel gas and the oxidant gas supplied to the fuel cell stack 1, thus controlling the generated power of the fuel cell stack 1.

Figure 3:
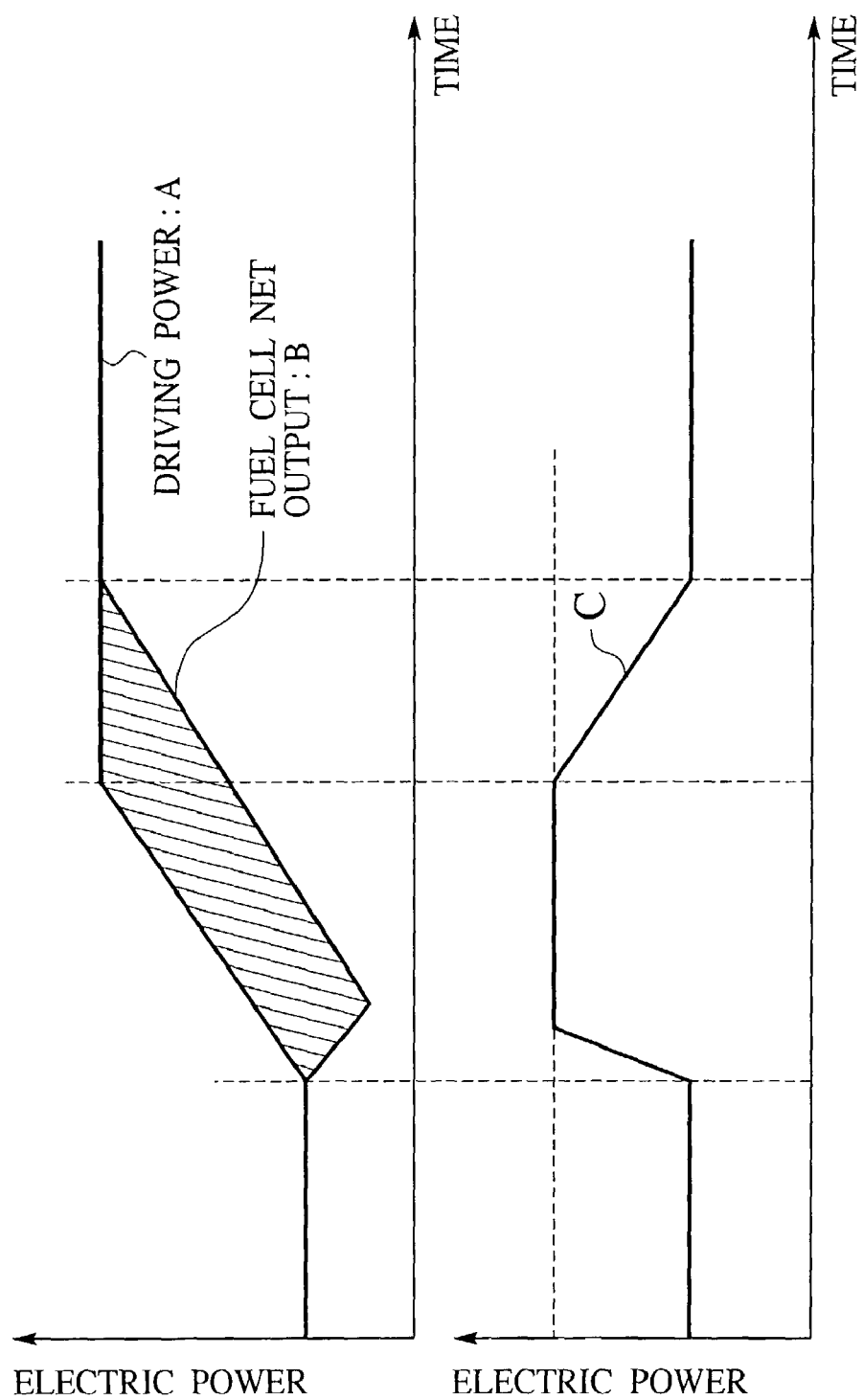
FIG. 3 is a graph showing a relation between electric power required by a load unit and margin load power.

FIG. 3 shows changes in electric power supplied from the fuel cell stack and the power storage unit 8 to the load so as to correspond to the changes in the electric power required by the load unit 9. As apparent from FIG. 3, in the case where the curve A represents the electric power necessary for driving the load unit 9, if the fuel cell stack 1 can only generate the electric power represented by the curve B, the power generation amount of the fuel cell stack 1 is compensated by the power storage unit 8 supplying the electric power to the load unit 9. Specifically, the electric power represented by the curve C is for compensating the electric power represented by the shaded area in FIG. 3. Here, assuming the electric power represented by the curve C required at the time of the maximum acceleration of the vehicle, the value of the margin load power is set in advance and is stored in the margin load power memory section 23.

Figure 4:
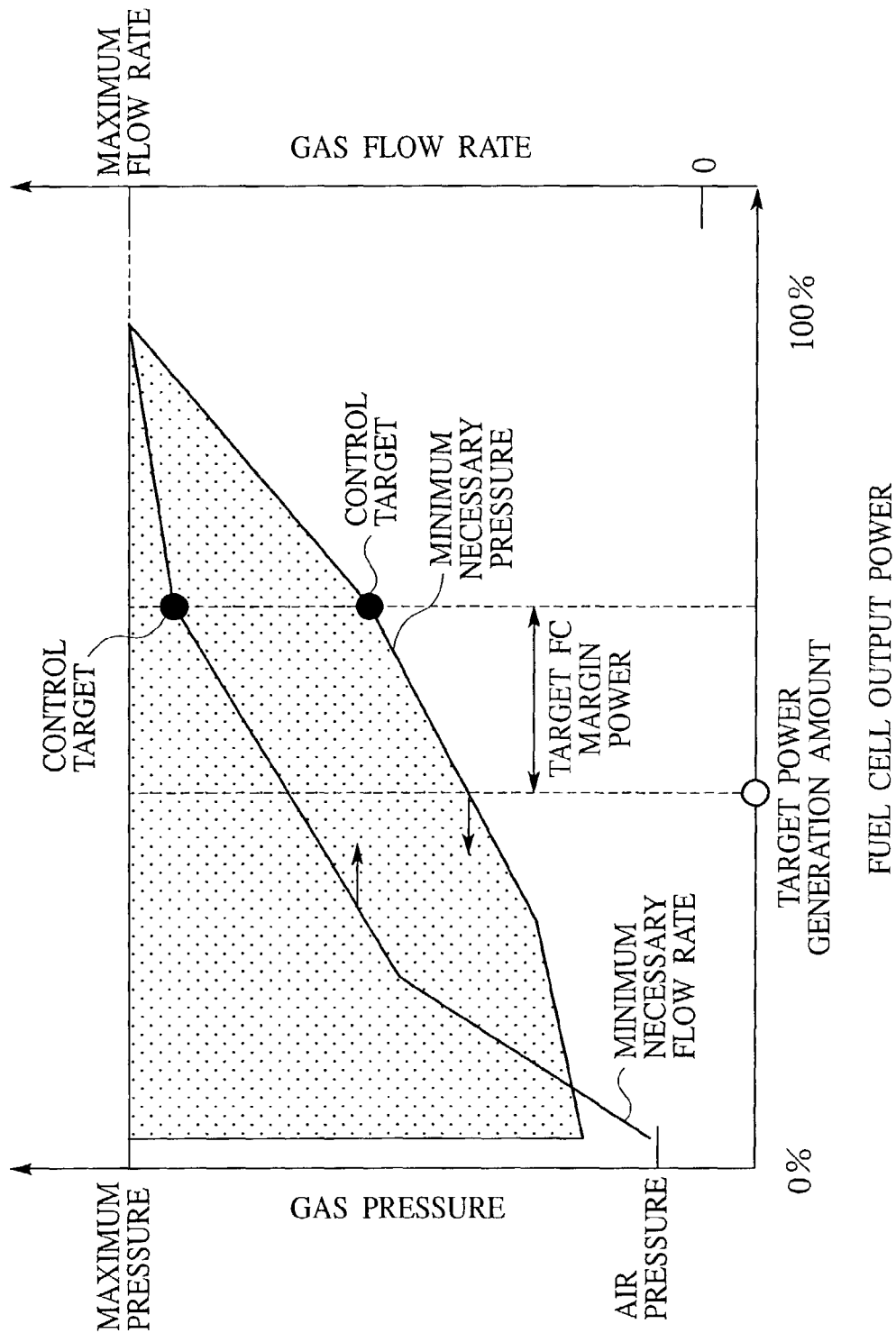
FIG. 4 is a graph showing a relation between output power of a fuel cell stack, and pressure values and flow rates of fuel gas and oxidant gas.

FIG. 4 shows a relation between output power of the fuel cell stack 1 and pressure values, as well as flow rates of fuel gas and oxidant gas. In FIG. 4, solid lines represent the minimum necessary flow rate and the minimum necessary pressure for taking out the electric power from the fuel cell stack 1. Here, the gas supply amount control section 28 controls each component such that the control target flow rate and pressure are set as the flow rate value and the pressure value (shown by • in FIG. 4) increased by the target FC margin power, and then, the electric power actually taken out from the fuel cell stack 1 is set as the target power generation amount (shown by ○ in FIG. 4). Consequently, a sum of the electric power of the target power generation amount and the target FC margin power can be taken out from the fuel cell stack 1. When the load unit 9 is operated at the maximum load and the requirement for the required load power occurs, the control unit 10 controls the operation such that the amount of the electric power equivalent to the target FC margin power is immediately taken out from the fuel cell stack 1 and is supplied to the load unit 9.

On the other hand, when the target FC margin power is zero, the gas supply amount control section 28 controls the motor 5 to reduce a drive amount of the compressor 4 so as to obtain the minimum necessary flow rate and the minimum necessary pressure, and then, the electric power actually taken out from the fuel cell stack 1 is set as the target power generation amount. In other words, when obtaining the output power represented by ○ in FIG. 4, the gas supply amount control section 28 sets the points at which the dotted line extending from ○ in FIG. 4 crosses with the lines representing each of properties as the control target flow rate and the control target pressure.

Figure 5:
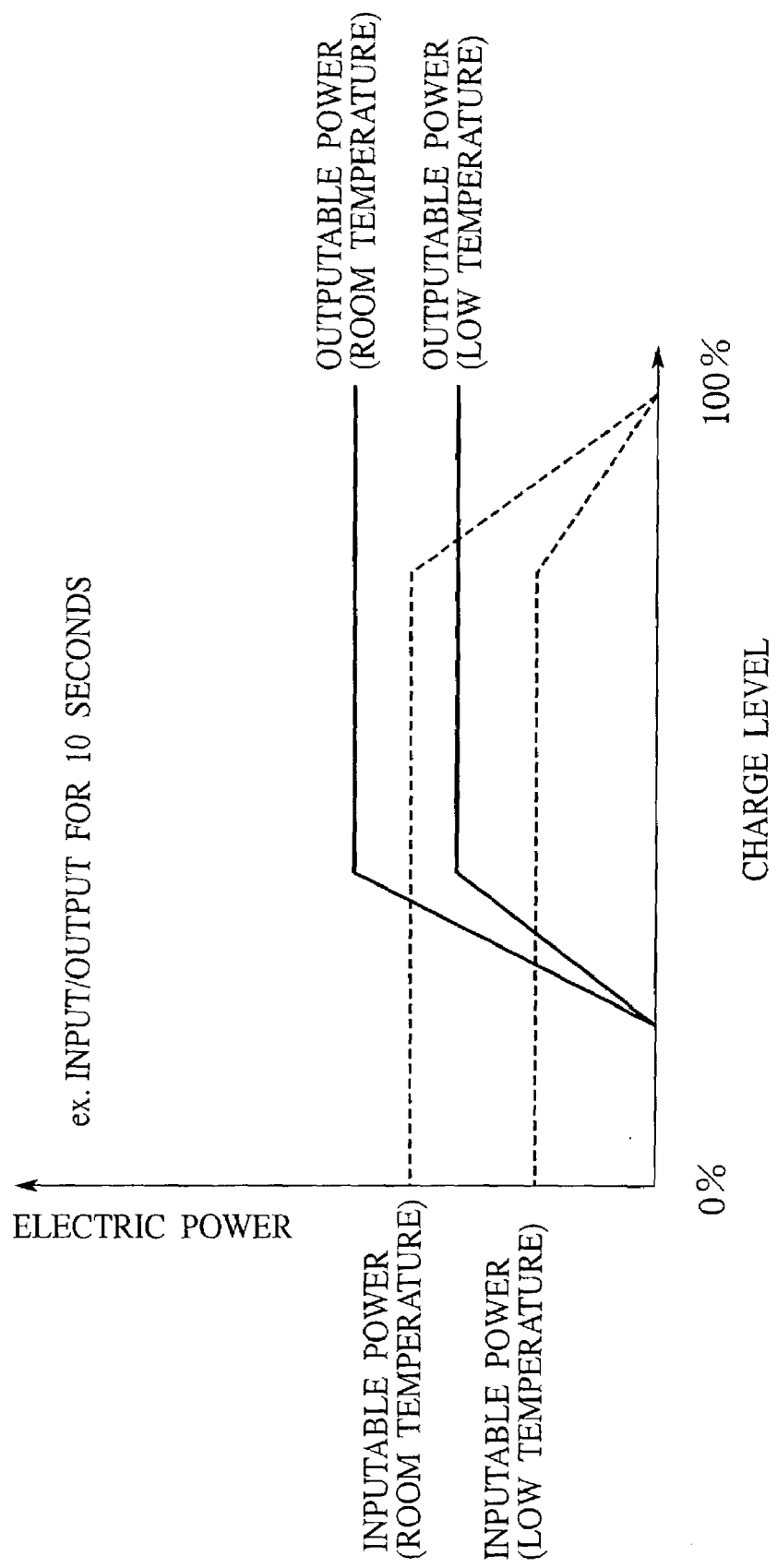
FIG. 5 is a graph showing a relation among a charge level, inputable power and outputable power.

FIG. 5 shows changes in the outputable power and the inputable power with respect to a charge level (SOC). The outputable power and the inputable power also change in accordance with temperatures, and FIG. 5 shows each of the properties at a room temperature and at a low temperature.

Power Control Process of Control Unit 10

Figure 6:
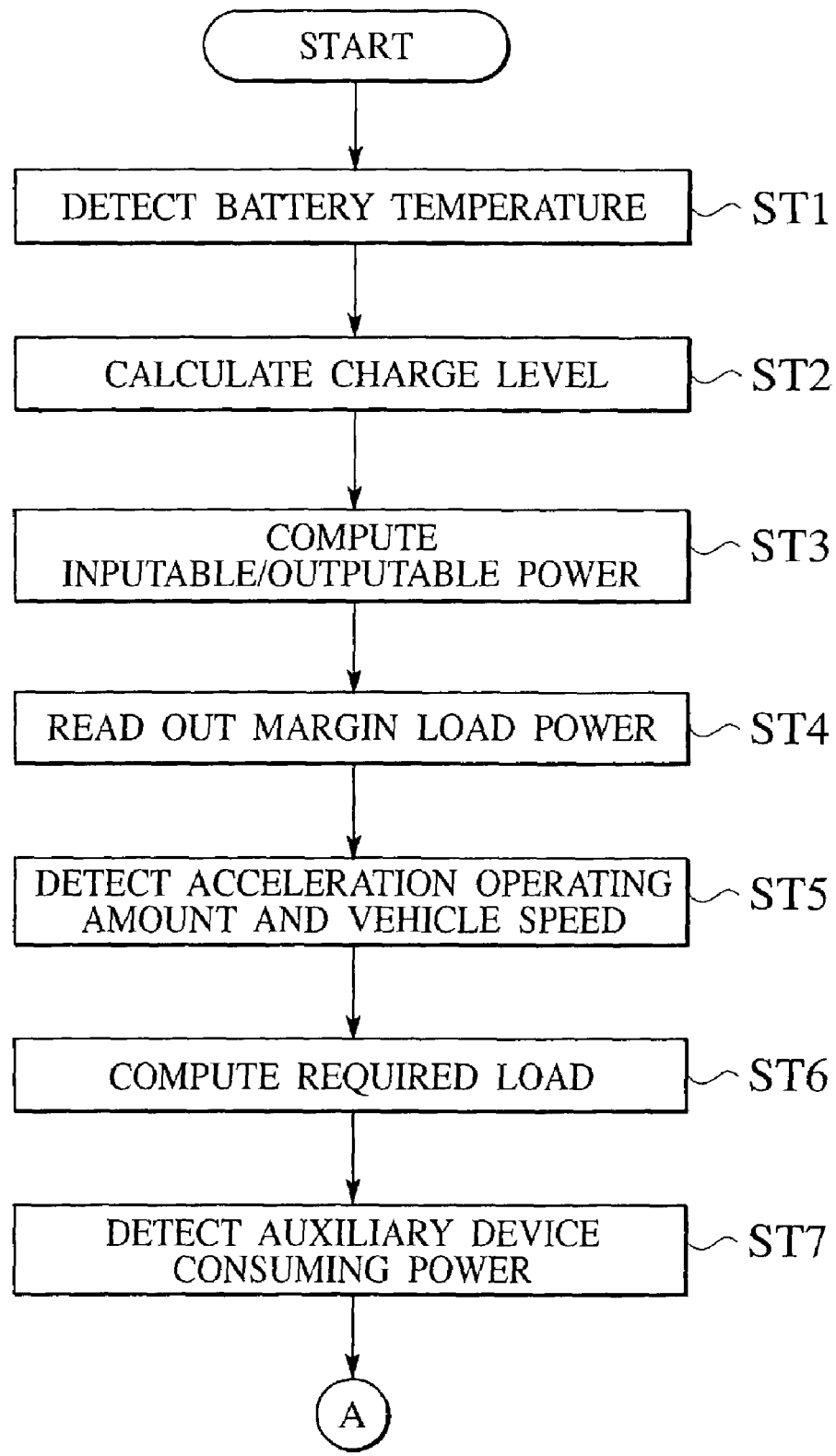
FIG. 6 is a flow chart showing process steps of a power control process by the control unit.

In FIGS. 6 and 7, process steps are shown of a power control process by the control unit 10 having the above-described constitution. According to FIG. 6, when driving the load unit 9, the control unit 10 first detects a temperature of the power storage unit 8 by the outputable power computing section 22 based on a sensor signal from the battery sensor (not shown) in step ST1, and then the process proceeds to the next step ST2.

In step ST2, the control unit 10 calculates the charge level based on a current value and a voltage value of the power storage unit 8 and outputs the result to the inputable/outputable power computing section 22.

Next, in step ST3, the inputable/outputable power computing section 22 calculates the inputable power information S14 and the outputable power information S13 according to the battery temperature and the charge level obtained in steps ST1 and ST2. Here, the inputable/outputable power computing section 22 obtains the inputable power and the outputable power based on the properties of the inputable power and the outputable power with respect to the charge level as shown in FIG. 5, the battery temperatures and the charge level.

Subsequently, the control unit 10 reads out the margin load power information stored in the margin load power memory section 23 in step ST4.

In the next step ST5, the accelerator operating amount information and the vehicle speed information are inputted to the required load computing section 21. In the next step ST6, the required load computing section 21 computes the required load power required by the load unit 9 based on the accelerator operating amount information and the vehicle speed information.

In the next step ST7, the auxiliary device consumption power computing section 26 computes the auxiliary device consumption power information S115.

In the next step ST8 shown in FIG. 7, the target charge amount computing unit 24 compares the amount of the margin load power stored in the margin load power memory section 23 and the amount of the outputable power obtained in step ST3 to determine whether or not the margin load power is smaller than the outputable power. The target charge amount computing unit 24 proceeds to step ST9 when the margin load power is smaller than the outputable power, and proceeds to step ST 11, which is described later, when the margin load power is not smaller than the outputable power.

When the margin load power is smaller than the outputable power, the target charge amount computing unit 24 recognizes that the outputable power can cover the margin load power as shown in FIG. 8A and that the margin load power can be secured without additional charging. Then, the target charge amount computing unit 24 outputs the target charged power information S116 having a zero target charge amount to the target power generation amount computing section 27, and then proceeds to step ST9.

In step ST9, the target power generation amount computing section 27 takes the target power generation amount to be equal to the required load power obtained in step ST6, and outputs the target generated power information S18 to the gas supply amount control section 28. Then, the target FC margin power is set to 0 in step ST19. Thereafter, the process proceeds to step ST10. Here, the target power generation computing section 27 also includes the auxiliary device consumption power, obtained in step ST7, in the target power generation amount.

On the other hand, if the margin load power is determined not to be smaller than the outputable power in step ST8, the target charge amount computing unit 24 computes an electric power difference of the outputable power with respect to the margin load power in step S11. In this case, the target charge amount computing unit 24 recognizes the electric power difference by subtracting outputable power from the margin load power.

Subsequently, in step ST12, the target charge amount computing unit 24 determines whether or not the electric power difference computed in step ST 11 is smaller than the inputable power. When it is determined that the power difference is smaller than the inputable power, the target charge amount computing unit 24 proceeds to step ST13, but when determined that the electric power difference is not smaller than the inputable power, the target charge amount computing unit 24 proceeds to step ST15, which is described later.

In step ST13, the target charge amount computing unit 24 recognizes that the electric power difference can be covered by charging the electric power equivalent to the inputable power as shown in FIG. 8B, and sets the electric power difference computed in step ST 11 as the target charge amount.

In the next step ST14, the target power generation amount computing section 27 receives the required load power obtained in step ST6 from the required load computing section 21, and at the same time, receives the target charge amount obtained in step ST13 from the target charge amount computing unit 24. Then, the electric power amount obtained by adding the required load power and the target charge amount is set as the target power generation amount, and the target FC margin power is set to 0 in step ST18. Thereafter, the process proceeds to step ST10.

If it is determined that the electric power difference is not smaller than the inputable power in step ST12, the target charge amount computing unit 24 recognizes in step ST15 that the electric power difference cannot be covered by the inputable power as shown in FIG. 8C and sets the inputable power as the target charge amount.

In the next step ST 16, the target power generation amount computing section 27 adds the required load power from the required load computing section 21 and the target charge amount to obtain the target power generation amount. Here, the target power generation amount computing section 27 includes the auxiliary device consumption power, obtained in the above-described step ST7, in the target power generation amount.

In the next step ST17, the target FC margin power computing section 25 obtains the electric power difference by subtracting the outputable power from the margin load power, and then, the target FC margin power (deficient amount of the electric power) is obtained by subtracting the inputable power from the obtained power difference. Thereafter, the process proceeds to step ST10. In the next step ST10, the gas supply amount control section 28 outputs the control signal for controlling each component based on the target generated power information S18, and then sets the flow rate and the pressure of the fuel gas and the oxidant gas so as to obtain the target generation amount and the target FC margin power as shown in FIG. 4.

Effect of the Embodiment

According to the control unit 10 performing the process as described above, in the case where both the outputable power is smaller than the margin load power as shown in FIG. 8B, and the inputable power is larger than the electric power difference, the target power generation amount is set so as to compensate for the electric power difference with the target charge amount. By doing so, the margin load power can be taken out at any time.

As shown in FIG. 9A for example, the generated power output of the fuel cell stack 1 exceeds the required load during the period T1 before the load of the load unit 9 is changed, and the electric power is charged to the power storage unit 8 as shown in FIG. 9B. The sum total of the target charged power at this time and the outputable power becomes the margin load power. Note that the difference between the fuel cell output (Net) and the fuel cell output (Gross) is the electric power consumed by the auxiliary devices.

Here, as shown in FIG. 9A, the electric power equivalent to the target charge amount can be supplied since the target charge amount is set so as to secure the margin load power at all times, even in the case where the required load is largely changed during the next period T2, the change in the electric power output from the fuel cell stack 1 delays with respect to the changing speed of the required load, and the required load exceeds the sum total value of the electric power output from the fuel cell stack 1 and the outputable power of the power storage unit 8. Therefore, according to the fuel cell system, even when the load of the load unit 9 is drastically changed, it becomes possible to supply the margin load power to the load unit 9 and to make the electric power supply to follow the change in the required load.

Also, in this fuel cell system, the electric power supplied from the power storage unit 8 to the load unit 9 can be kept within the outputable power. Therefore, according to the fuel cell system, it becomes possible to inhibit the progression of deterioration of the power storage unit 8.

Moreover, during the period T3 after the load change, the fuel cell system continues to charge the power storage unit 8, thus making it possible to set the charge level high enough to cover the margin load power with the outputable power. Therefore, according to the fuel cell system, when the required load of the load unit 9 is not changed, electric charge is provided to the power storage unit 8, thus making it possible to supply the margin load power.

Also, according to the control unit 10 performing the process as described above, in the case where the outputable power is smaller than the margin load power as shown in FIG. 8C, even when the inputable power is smaller than the electric power difference therebetween, the margin load power can be secured by setting the target FC margin power.

For example, as shown in FIG. 10A, during the period T1 before the load of the load unit 9 changes, the fuel cell output (Net) exceeds the required load, and the electric power is charged to the power storage unit 8 with the electric power smaller than the inputable power as shown in FIG. 10B.

Here, it is assumed that, since the inputable power of the power storage unit 8 is small during the period T1, the margin load power cannot be covered only by the sum total of the charged electric power and the outputable power in the period T1. Contrary to this, in the fuel cell system, it is assumed that the target FC margin power is set in step ST17 and the surplus electric power can always be outputted. Then, when the required load of the load unit 9 becomes large, the electric power already taken out and the target FC margin power are taken out from the fuel cell stack 1, and at the same time, the charged power of the power storage unit 8 is supplied to the load unit 9.

Therefore, according to the fuel cell system, it is possible to immediately take out the target FC margin power and to shorten the period of time in which the output of the fuel cell stack 1 is insufficient with respect to the load, and it is also possible to reduce the insufficient amount of the output of the fuel cell stack 1. Also, the electric power can be supplied in response to the change in the required load.

Furthermore, according to the fuel cell system, it is possible to cope with the load change rapidly by supplying the target FC margin power to the load unit 9 even when the power storage unit 8 operating at a low temperature cannot output much electric power in comparison to that at the room temperature as shown in FIG. 5, and even when electric power is not thus sufficiently supplied with respect to the load change.

Also, according to the fuel cell system, the electric power inputted to the power storage unit 8 can be kept within the outputable power, and the electric power outputted from the power storage unit 8 can be kept within the outputable power. Therefore, it is possible to inhibit the progression of deterioration of the power storage unit 8.

Notification Process of the Control Unit 10

Next, description will be made for a notification process for a user at the time of supplying the target FC margin power to the load unit 9 by the control unit 10 with reference to FIG. 11.

Figure 11:
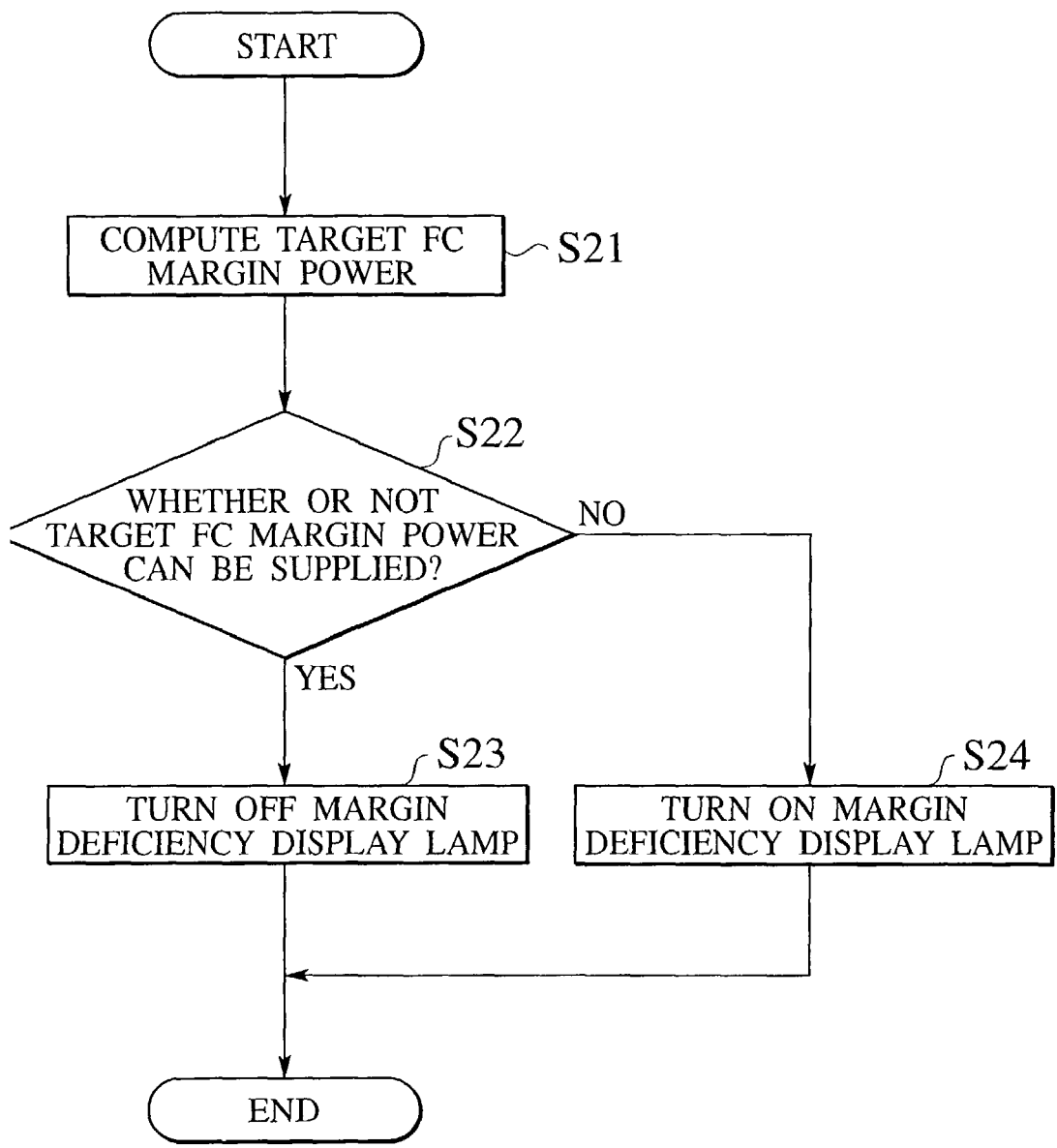
FIG. 11 is a flow chart of a notification process performed for a user when a target FC margin power is supplied to the load unit by the control unit.

According to FIG. 11, first in step ST21, the target FC margin power is computed by the target FC margin power computing section 25 similarly to the above-described step ST17 for example, and the process proceeds to step ST22.

In step ST22, the target FC margin power computing section 25 controls the pressure control valve 3, the motor 5, and the pressure control valve 6, and then judges whether or not the target FC margin power computed in step ST21 can be obtained. When it is judged possible to obtain the target FC margin power, the target FC margin power computing section 25 proceeds to step ST23. When it is judged impossible to obtain the target FC margin power, the target FC margin power computing section 25 proceeds to step ST24.

In step ST23, the target FC margin power computing section 25 carries out a control so as to turn off a margin deficiency lamp, which notifies the vehicle driver that it is impossible to supply the target FC margin power.

In step ST24, the target FC margin power computing section 25 carries out a control so as to turn on the margin deficiency lamp.

By doing so, in the fuel cell system, it becomes possible to notify the vehicle driver that the acceleration performance is lowered. In addition, by notifying that there remains little power left for a demanding case such as rapid acceleration, it becomes possible to promote driving operations according to situations.

Here, means for notifying the infeasibility of the target FC margin power to the vehicle driver is not limited to a lamp, and a display machinery and an audio machinery (not shown) may be used.

Judgment Process Based on Temperature of Fuel Cell Stack 1

Next, description will be made for an example with reference to FIG. 12, in which the judgment in step ST22 shown in FIG. 11 is carried out based on a temperature of the fuel cell stack 1.

Figure 12:
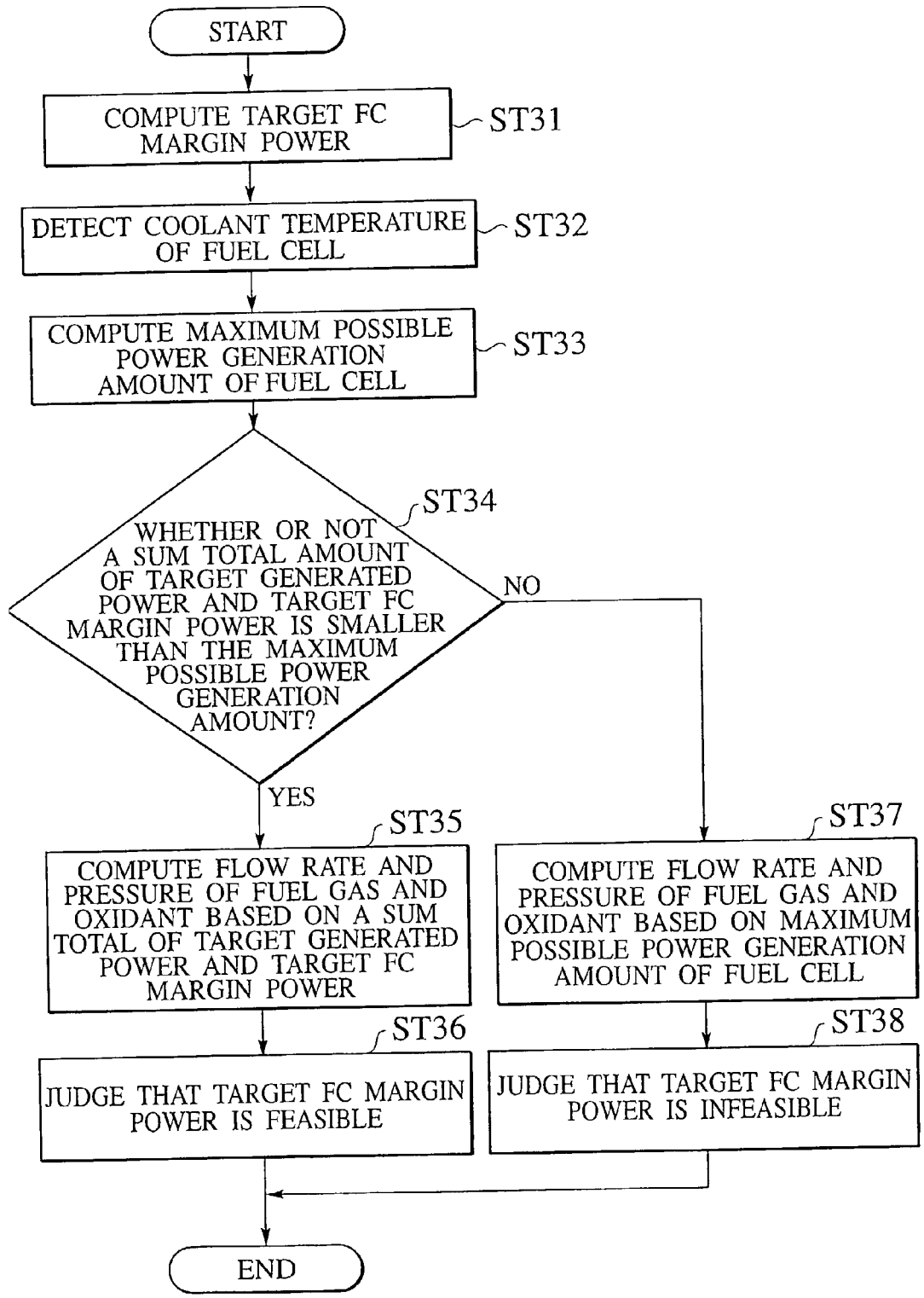
FIG. 12 is a flow chart showing process steps for judging whether or not an electric power equivalent to a target FC margin power can be generated, based on the temperature of the fuel cell stack.

According to FIG. 12, in step ST31, the target FC margin power computing section 25 computes the target FC margin power similarly to the above-described process and starts the following process.

In the next step ST32, a temperature of a coolant supplied to the fuel cell stack 1 is detected by a temperature sensor (not shown).

Figure 13:
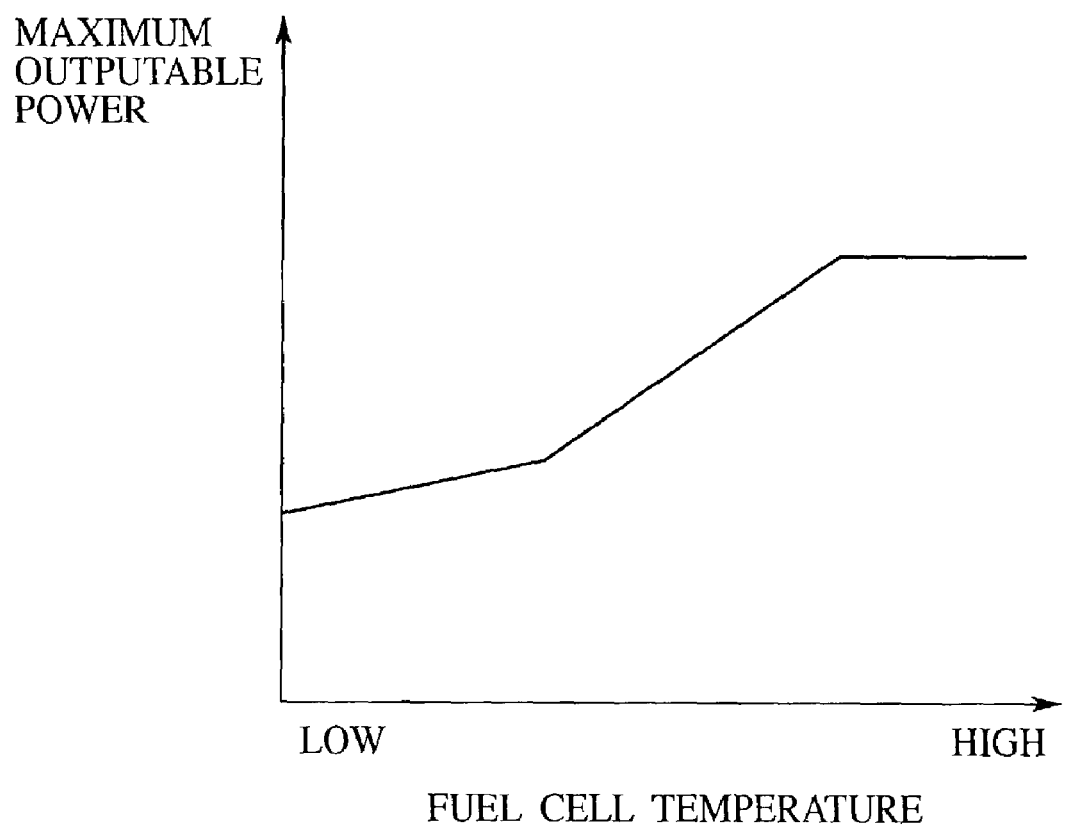
FIG. 13 is a graph showing a relation between a coolant temperature (fuel cell temperature) from the fuel cell stack and a maximum outputable power of the fuel cell stack.

In the next step ST33, the maximum possible power generation amount of the fuel cell stack 1 is computed based on the coolant temperature detected in step ST32. Here, the maximum possible power generation amount of the fuel cell stack 1 is obtained based on the coolant temperature with reference to the relation between the coolant temperature (fuel cell temperature) from the fuel cell stack 1 and the maximum possible power generation amount of the fuel cell stack 1 as shown in FIG. 13.

In the next step ST34, a sum total amount of the target generated power and the target FC margin power is compared to the maximum possible power generation amount of the fuel cell stack 1. When the sum total amount of the target generated power and the target FC margin power is smaller than the maximum possible power generation amount of the fuel cell stack 1, the process proceeds to step ST35. When the sum total amount of the target generated power and the target FC margin power is not smaller than the maximum possible power generation amount of the fuel cell stack 1, the process proceeds to step ST37.

In step ST35, the flow rate and the pressure of the fuel gas and the oxidant gas for generating the electric power are computed, where the electric power is the sum total of the target generated power and the target FC margin power at the fuel cell stack 1. Then the process proceeds to step ST36.

In step ST36, it is judged that the target FC margin power is feasible, and then the process proceeds to step ST 23 in FIG. 11.

On the other hand, when it is judged that the sum total amount of the target generated power and the target FC margin power is larger than the maximum possible power generation amount of the fuel cell stack 1 in step ST34, the process proceeds to step ST37. In step ST37, the gas supply amount control section 28 computes the flow rate and the pressure of the fuel gas and the oxidant gas based on the maximum possible power generation amount of the fuel cell stack 1 computed in step ST33. Then, the process proceeds to step ST38.

In step ST38, it is judged that the target FC margin power is infeasible. Then, the process proceeds to step ST24 in FIG. 11.

According to the fuel cell system performing such process as described above, the maximum possible power generation amount of the fuel cell stack 1, which changes with the temperature changes of the fuel cell stack 11 is obtained to judge whether or not the target FC margin power can be supplied in order to cover the margin load power. Therefore, it becomes possible to accurately determine that there remains little power left for an excessive load change based on the temperature state of the fuel cell stack 1.

Judgment Process Based on Stoichiometric Ratio

Next, description will be made for an example where the judgment of step ST22 in FIG. 11 is carried out based on the stoichiometric ratio of the fuel gas or the oxidant gas shown in FIG. 14.

Figure 14:
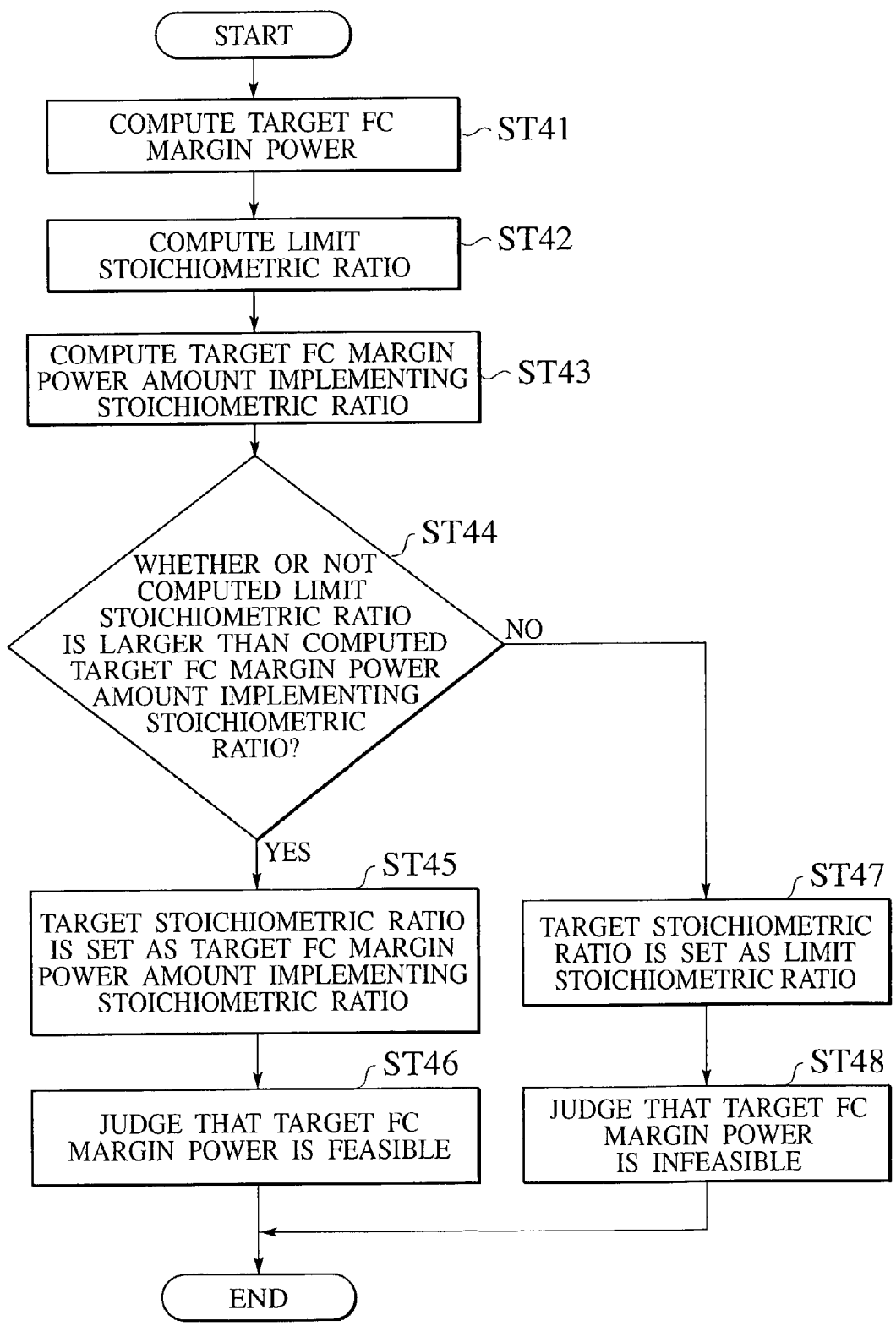
FIG. 14 is a flow chart showing process steps for judging whether or not an electric power equivalent to a target FC margin power can be generated, based on a stoichiometric ratio of fuel gas or oxidant gas.

As shown in FIG. 14, in step ST41, the target FC margin power is computed by the target FC margin power computing section 25 similarly to the above-described process. Then the process proceeds to step ST42 to start the following process.

Figure 15:
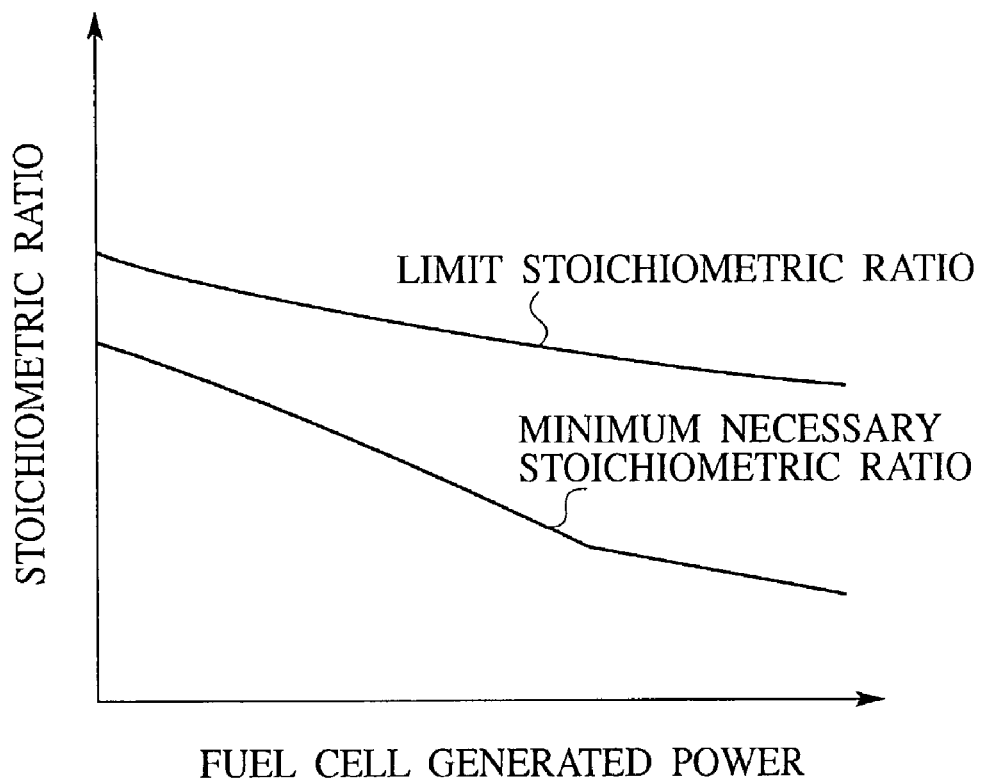
FIG. 15 is a graph showing a relation between the stoichiometric ratio and electric power generated from the fuel cell stack.

In step ST42, a limit stoichiometric ratio is computed based on the target power generation amount and the target FC margin power. Then the process proceeds to step ST43. Here, the stoichiometric ratio is a value obtained by dividing the gas supply amount to the fuel cell stack 1 by the gas supply amount consumed by fuel cell stack 1, and the stoichiometric ratio changes depending on the generated power of the fuel cell stack 1, as shown in FIG. 15. In this case, the limit stoichiometric ratio also changes depending on pure-water collection efficiency and humidification properties of the fuel cell system.

In step ST43, a target FC margin power amount implementing the stoichiometric ratio is computed by dividing the flow rates of the fuel gas and the oxidant gas necessary for implementing the power generation of the sum total of the target generated power and the target FC margin power by the flow rates of the fuel gas and the oxidant gas consumed when the power is generated. Then, the process proceeds to step ST44.

In step ST44, the limit stoichiometric ratio computed in step ST42 and the target FC margin power amount implementing the stoichiometric ratio computed in step ST43 are compared to each other. When it is judged that the target FC margin power amount implementing the stoichiometric ratio is larger than the limit stoichiometric ratio, the process proceeds to step ST45. When it is judged that the target FC margin power amount implementing the stoichiometric ratio is not larger than the limit stoichiometric ratio, the process proceeds to step ST47.

In step ST45, a target stoichiometric ratio is set as the target FC margin power amount implementing the stoichiometric ratio, and then the process proceeds to step ST46.

In step ST46, it is judged that the target FC margin power is feasible, and then the process proceeds to step ST 23 in FIG. 11.

In step ST47, a target stoichiometric ratio is set as the limit stoichiometric ratio shown in FIG. 15, and then the process proceeds to step ST48.

In step ST48, it is judged that the target FC margin power is infeasible, and then the process proceeds to step ST24 in FIG. 11.

According to the fuel cell system performing such a process as described above, the maximum possible power generation amount of the fuel cell stack 1, which changes depending on the consumption change of the fuel cell stack 1, is obtained. It is then judged whether or not the target FC margin power for covering the margin load power can be supplied. Therefore, it becomes possible to accurately determine that there remains little power left for an excessive load change based on the consumption state of the fuel cell stack 1.

Note that the above-described embodiment is an example of the present invention. Accordingly, the present invention is not limited to the above-described embodiment. As a matter of course, even in a case different from the above-described embodiment, various modifications are possible depending on the design and the like within the scope of the technical concepts related to the present invention.

INDUSTRIAL APPLICABILITY

According to the control apparatus of the fuel cell system of the present invention, when the outputable power is smaller than the margin load power, the power generation amount of the fuel cell is controlled such that the charged power becomes larger than the electric power difference between the margin load power and the outputable power. Therefore, even if the load of the load circuit is increased, the electric power is supplied from the power storage unit, and the electric power equivalent to the margin load power can be supplied. Thus, it is possible to realize sufficient power supply to the load whose used power changes.

Moreover, when the electric power difference between the margin load power and the outputable power is larger than the inputable power as a result of the amount judgment, the electric power is generated such that the inputable power becomes the charged power of the power storage unit, and the flow rate or the pressure of the gas supplied to the fuel cell is controlled such that the deficient amount of the electric power obtained by subtracting the inputable power and the outputable power from the margin load power is always generated. Therefore, even if the power storage unit cannot sufficiently supply the electric power with respect to the load change due to a low temperature and the like, it becomes possible to immediately supply the electric power to the load circuit.

Also, according to the control apparatus of the fuel cell system of the present invention, it is judged that the fuel cell cannot generate the electric power equivalent to the deficient power amount with respect to the required margin power based on at least one of the temperature of the fuel cell, the stoichiometric ratio, the flow rate, and the pressure of the oxidant gas, and the stoichiometric ratio, the flow rate, and the pressure of the fuel gas. Therefore, it becomes possible to notify that there remains little power left for the load change, depending on the state of the fuel cell.

Furthermore, according to the control apparatus of the fuel cell system of the present invention, when the fuel cell cannot generate the electric power equivalent to the deficient power amount, the user is notified that the required margin power cannot be secured. Therefore, it becomes possible to accurately notify that there remains little power left for the load change.

Still furthermore, in the control apparatus of the fuel cell system of the present invention, the electric power supplied from the power storage unit to the load circuit is set to be equal to the outputable power or smaller, and the electric power inputted from the fuel cell to the power storage unit is set to be equal to the inputable power of the power storage unit or smaller. Therefore, it becomes possible to inhibit the progression of deterioration of the power storage unit.

According to the control method of the fuel cell system of the present invention, when the outputable power is smaller than the margin load power as a result of the amount judgment, the power generation amount of the fuel cell is controlled such that the charged power becomes larger than the electric power difference between the margin load power and the outputable power. Therefore, even if the load of the load circuit is increased, the electric power is supplied from the power storage unit, and the electric power equivalent to the margin load power can be supplied. Thus, it is possible to realize sufficient power supply to the load whose used power changes.

Moreover, when the electric power difference between the margin load power and the outputable power is larger than the inputable power as a result of the amount judgment, the electric power is generated such that the inputable power becomes the charged power of the power storage unit, and the flow rate or the pressure of the gas supplied to the fuel cell is controlled such that the deficient amount of the electric power obtained by subtracting the inputable power and the outputable power from the margin load power is always generated. Therefore, even if the power storage unit cannot sufficiently supply the electric power with respect to the load change due to a low temperature and the like, it becomes possible to immediately supply the electric power to the load circuit.

Also, according to the control method of the fuel cell system of the present invention, it is judged that the fuel cell cannot generate the electric power equivalent to the deficient power amount for the required margin power based on at least one of the temperature of the fuel cell, the stoichiometric ratio, the flow rate, and the pressure of the oxidant gas, and the stoichiometric ratio, the flow rate, and the pressure of the fuel gas. Therefore, it becomes possible to notify that there remains little power left for the load change in accordance with the state of the fuel cell.

Furthermore, according to the control method of the fuel cell system of the present invention, when the fuel cell cannot generate the electric power equivalent to the deficient power amount, the user is notified that the required margin power cannot be secured. Therefore, it becomes possible to accurately notify the user that there remains little power left for the load change.

Still furthermore, in the control method of the fuel cell system of the present invention, the control means sets the electric power supplied from the power storage unit to the load circuit to be equal to the outputable power or smaller, and also sets the electric power inputted from the fuel cell to the power storage unit to be equal to inputable power of the power storage unit or smaller. Therefore, it becomes possible to inhibit the progression of deterioration of the power storage unit.

Although the invention has been described above by reference to certain embodiments of the invention, the invention is not limited to the embodiments described above, and alterations and modifications will occur to these skilled in the art, in light of the teachings. The scope of the invention is defined with reference to the following claims.

The invention claimed is:

1. A control apparatus for a fuel cell system in a vehicle, in which a fuel cell is adapted to generate electric power with supplied utilities, generated power being supplied to a load of the vehicle and to a power storage unit, where supplied power stored in the power storage unit is supplied therefrom to the load as necessary, and the load is driven by electric power supplied from the fuel cell and electric power supplied from the power storage unit, the control apparatus comprising:

a required load computing section configured to compute required power for the load based on a detected condition of the vehicle;

a margin load power setting section configured to set margin load power, which is an increased amount of electric power, over the currently required power, that would be needed to be supplied to the load from said power storage unit and said fuel cell assuming the required power for the load increases at a predetermined rate for a maximum acceleration of the vehicle;

an inputable power and outputable power computing section configured to compute inputable power and outputable power of said power storage unit; and a control section configured to:

compare the margin load power and the outputable power;

compare the inputable power and an electric power difference between said margin load power and said outputable power when said outputable power is smaller than the margin load power;

set the inputable power to be a charged power of said power storage unit when the electric power difference is larger than said inputable power; and control a flow rate or pressure of gas supplied to control a utility supply condition of said fuel cell to prepare to always generate electric power sufficient to immediately compensate for a deficient amount of electric power obtained by subtracting said inputable power and said outputable power from said margin load power and for the required power for the load based on the detected condition of the vehicle.

2. The control apparatus for the fuel cell system according to claim 1, further comprising:

a section for judging that said fuel cell cannot generate the electric power equivalent to the deficient power amount for said margin load power based on at least one of a temperature of the fuel cell, a stoichiometric ratio, a flow rate, and a pressure of the oxidant gas, and a stoichiometric ratio, a flow rate, and a pressure of the fuel gas.

3. The control apparatus for the fuel cell system according to claim 1, further comprising:

a notification section for notifying a user that said margin load power cannot be secured when said fuel cell cannot generate the electric power equivalent to said deficient power amount.

4. The control apparatus for the fuel cell system according to claim 1, wherein said control section sets the electric power supplied from said power storage unit to the load circuit to be equal to said outputable power or smaller, and also sets the electric power inputted from said fuel cell to said power storage unit to be equal to said inputable power of said power storage unit or smaller.

5. A control method for a fuel cell system in a vehicle, in which a fuel cell is adapted to generate electric power with supplied utilities, generated power being supplied to a load of the vehicle, and to a power storage unit, where supplied power stored in the power storage unit is supplied therefrom to the load as necessary, and the load is driven by electric power supplied from the fuel cell, and electric power supplied from the power storage unit, the control method comprising the steps of:

computing required power for the load based on a detected condition of the vehicle;

setting margin load power, which is an increased amount of electric power, over the currently required power, that would be needed to be supplied to the load from said power storage unit and said fuel cell assuming the required power for the load increases at a predetermined rate for a maximum acceleration of the vehicle;

computing inputable power and outputable power of said power storage unit;

comparing the margin load power and the outputable power;

comparing said inputable power and an electric power difference between said margin load power and said outputable power when said outputable power is smaller than the margin load power;

setting said inputable power to be a charged power of the power storage unit when the electric power difference is larger than said inputable power; and controlling a utility supply condition of said fuel cell to prepare to always generate electric power sufficient to immediately compensate for a deficient amount of electric power obtained by subtracting said inputable power and said outputable power from said margin load power and for the required power for the load based on the detected condition of the vehicle.

6. The control method of the fuel cell system according to claim 5, wherein it is judged that said fuel cell cannot generate the electric power equivalent to the deficient power amount for said margin load power based on at least one of a temperature of said fuel cell, a stoichiometric ratio, a flow rate, and a pressure of the oxidant gas, and a stoichiometric ratio, a flow rate, and a pressure of the fuel gas.

7. The control method of the fuel cell system according to claim 5, wherein a user is notified that the required margin power cannot be secured when said fuel cell cannot generate the electric power equivalent to said deficient power amount.

8. The control method of the fuel cell system according to claim 5, wherein the electric power supplied from said power storage unit to said load circuit is set to be equal to the outputable power or smaller, and also the electric power inputted from said fuel cell to said power storage unit is set to be equal to said inputable power of said power storage unit or smaller.

9. A control apparatus for a fuel cell system in a vehicle, in which a fuel cell is adapted to generate electric power with supplied utilities, generated power being supplied to a load of the vehicle, and to a power storage unit, where supplied power stored in the power storage unit is supplied therefrom to the load as necessary, and the load is driven by electric power supplied from the fuel cell, and electric power supplied from the power storage unit, the control apparatus comprising:

required load computing means for computing required power for the load based on a detected condition of the vehicle;

margin load power setting means for setting margin load power, which is an increased amount of electric power, over the currently required power, that would be needed to be supplied to the load from said power storage unit and said fuel cell assuming the required power for the load increases at a predetermined rate for a maximum acceleration of the vehicle;

inputable power and outputable power computing means for computing inputable power and outputable power of said power storage unit; and control means for comparing the margin load power and the outputable power, comparing said inputable power and an electric power difference between said margin load power and said outputable power when said outputable power is smaller than the margin load power, setting said inputable power to be a charged power of said power storage unit when the electric power difference is larger than said inputable power, and controlling a utility supply condition of said fuel cell to prepare to always generate electric power sufficient to immediately compensate for a deficient amount of electric power obtained by subtracting said inputable power and said outputable power from said margin load power and for the required power for the load based on the detected condition of the vehicle.

10. The control apparatus for the fuel cell system according to claim 9, further comprising:
a judging means for judging that said fuel cell cannot generate the electric power equivalent to the deficient power amount for said margin load power based on at least one of temperature of the fuel cell, a stoichiometric ratio, a flow rate, and a pressure of the oxidant gas, and a stoichiometric ratio, a flow rate, and a pressure of the fuel gas.

11. The control apparatus for the fuel cell system according to claim 9, further comprising:
a notification means for notifying a user that said margin load power cannot be secured when said fuel cell cannot generate the electric power equivalent to said deficient power amount.

12. The control apparatus for the fuel cell system according to claim 9,
wherein said control means sets the electric power supplied from said power storage unit to the load circuit to be equal to said outputable power or smaller, and also sets the electric power inputted from said fuel cell to said power storage unit to be equal to said inputable power of said power storage unit or smaller.

* * * * *